United States Patent
Zemanek, Jr.

[11] 3,979,714
[45] Sept. 7, 1976

[54] TWO-RECEIVER, VARIABLE-DENSITY LOGGING SYSTEM

[75] Inventor: Joseph Zemanek, Jr., Dallas, Tex.

[73] Assignee: Mobil Oil Corporation, New York, N.Y.

[22] Filed: July 17, 1974

[21] Appl. No.: 489,203

[52] U.S. Cl. ............... 340/15.5 DS; 340/15.5 TN; 340/18 R; 346/33 WL; 346/110 R
[51] Int. Cl.$^2$ .................. G01V 1/34; G01V 1/40
[58] Field of Search ............ 340/15.5 TN, 15.5 BH, 340/18 R, 18 P, 15.5 DS; 346/33 WL, 110; 235/61.6 A

[56] References Cited
UNITED STATES PATENTS

| | | | |
|---|---|---|---|
| 3,374,851 | 3/1968 | Brokaw | 340/18 R |
| 3,402,388 | 9/1968 | Tucker | 346/110 R |
| 3,803,588 | 4/1974 | Le Schack | 235/61.6 A |

Primary Examiner—Howard A. Birmiel
Attorney, Agent, or Firm—C. A. Huggett; George W. Hager, Jr.

[57] ABSTRACT

An acoustic velocity logging tool employs a transmitter and a pair of receivers. Acoustic pulses from the transmitter pass through the formation surrounding the borehole to the receivers. The received signals, along with control signals, are transferred to an uphole recording system. A record unit operates to apply these receiver and control signals to a magnetic tape recorder. A playback unit transfers the recorded receiver signals to the intensity modulation input of a cathode-ray oscilloscope and, in response to the recorded control signals, applies a trigger pulse to the sweep input of the cathode-ray oscilloscope, successive sweeps of the cathode-ray oscilloscope being intensity modulated alternately by the recorded receiver signals of the pair of receivers. A film recorder makes a continuous film recording of the receiver signals as they appear as variable-density traces on the face of the cathode-ray oscilloscope to provide a two-receiver, variable-density recording. A ΔT unit computes the interval traveltime of the acoustic pulses between the two receivers as represented by the two variable-density recordings. A plotter produces a continuous curve of this interval traveltime in correlation with the depth of the receivers in the borehole.

8 Claims, 30 Drawing Figures

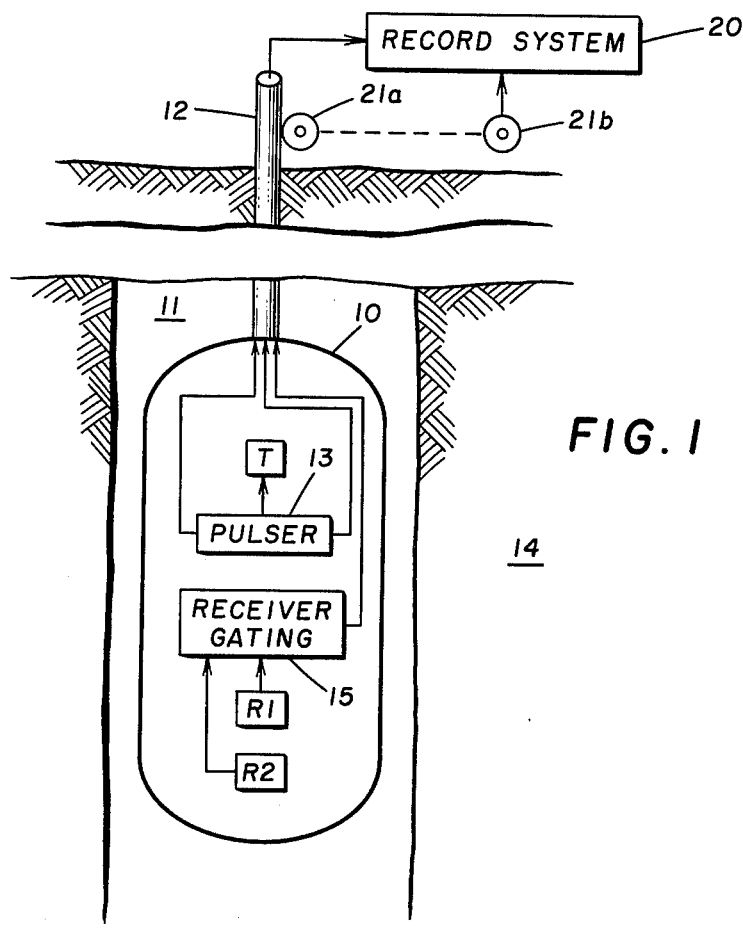
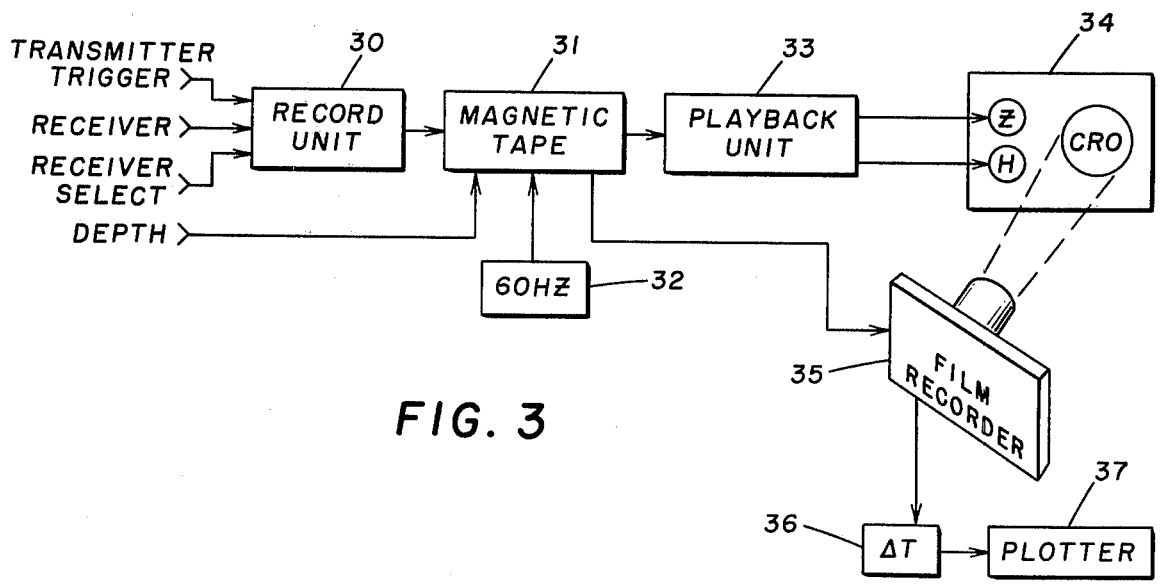
FIG. 1
FIG. 3

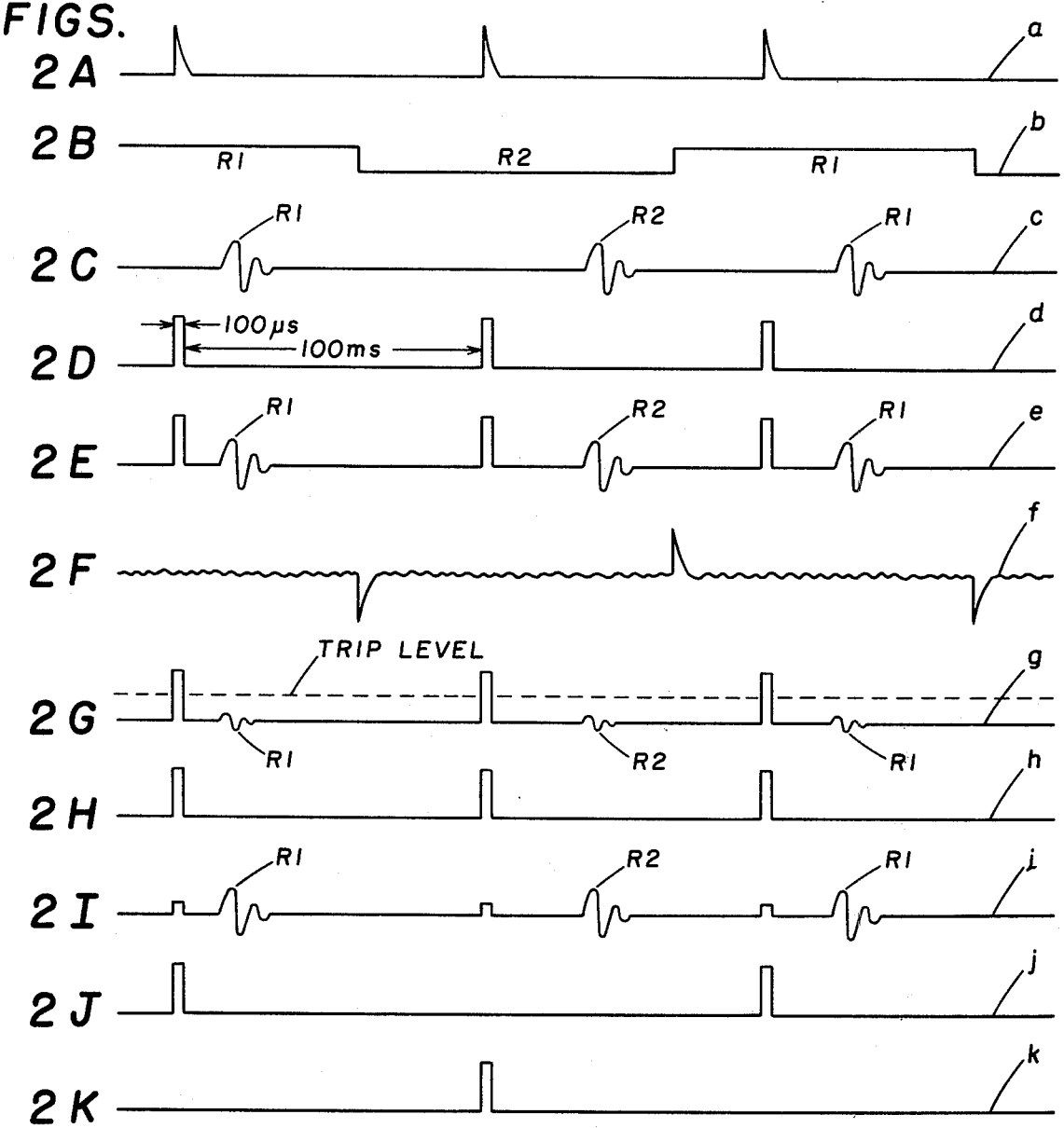

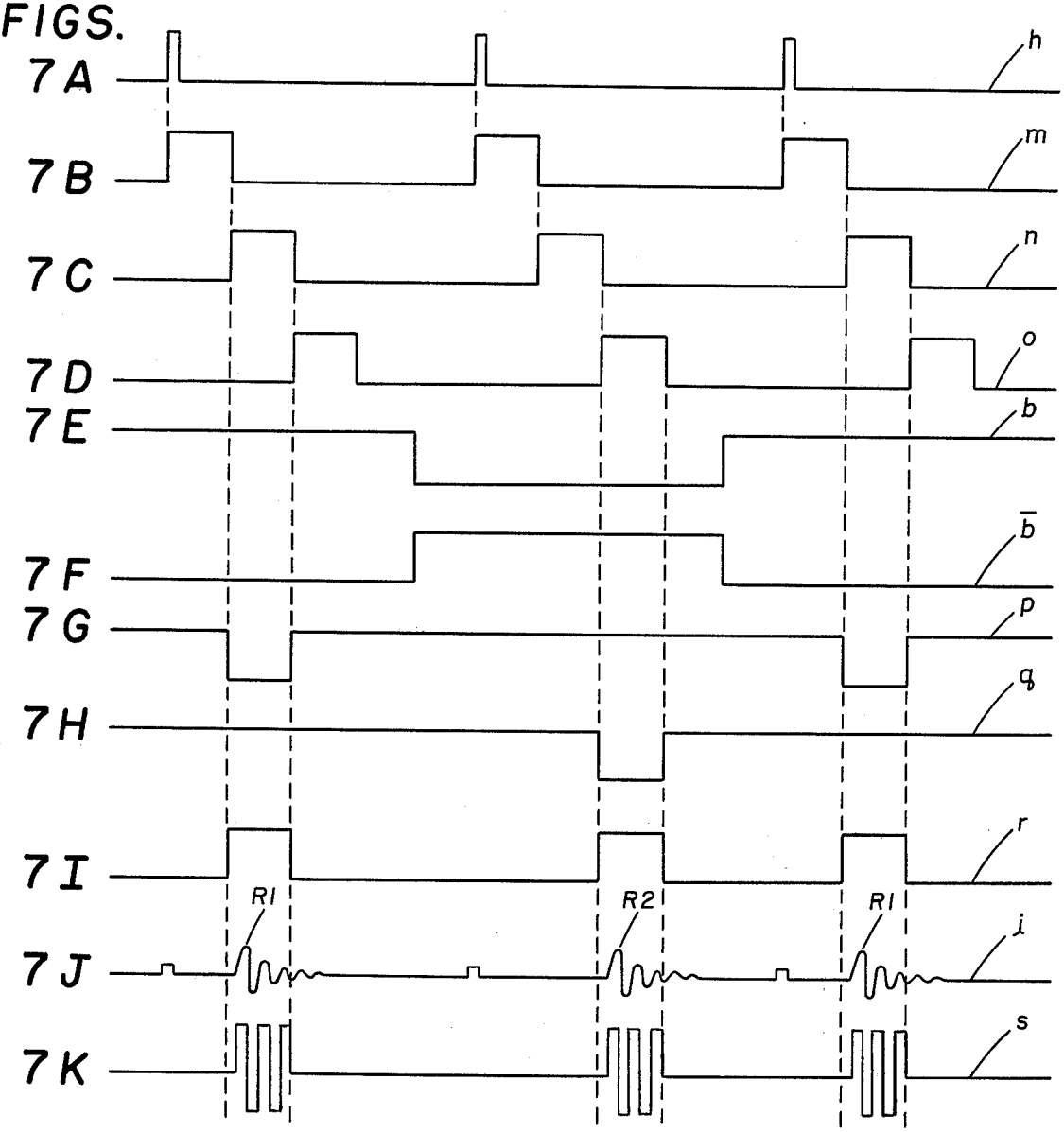
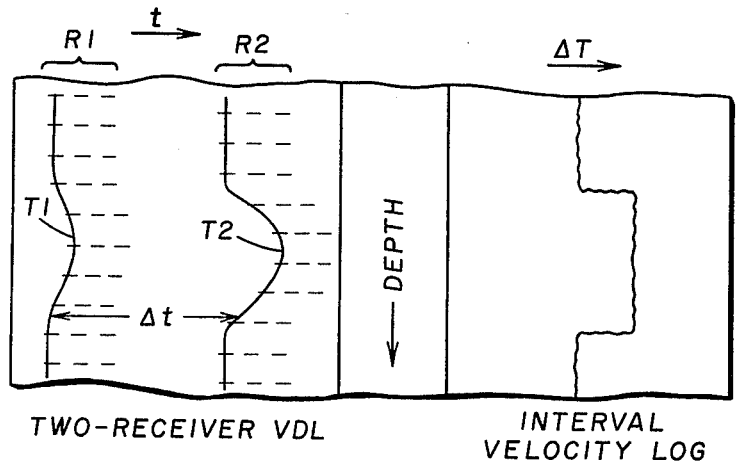
FIG. 8

TWO-RECEIVER, VARIABLE-DENSITY LOGGING SYSTEM

BACKGROUND OF THE INVENTION

This invention relates to a recording system for use with an acoustic logging tool.

In petroleum exploration, well logging techniques are used to determine the character of subsurface formations penetrated by a borehole. One technique of logging these characteristics employs a logging tool including a transmitter of acoustic pulses and a receiver, or receivers, for detecting these acoustic pulses after they have traversed the subsurface formations adjacent the tool. By measuring the traveltime of an acoustic pulse from the transmitter through the formation to the receiver, an indication of the velocity of the acoustic pulse through the subsurface formation is obtained and this acoustic velocity is an indication of the character of the subsurface formation. By recording the acoustic velocity in correlation with depth of borehole as the tool moves through the borehole, there is obtained a log of the velocity characteristics of the subsurface formations as a function of depth. Such logs are quite useful, particularly in the exploration for oil-bearing subsurface strata.

In U.S. Pat. No. 3,302,166, to Joseph Zemanek, Jr., there is disclosed an acoustic velocity logging system wherein a downhole tool comprises a plurality of transducers including a transmitter and multiple receivers. The receivers are spaced at different distances from the transmitter such that an acoustic pulse from the transmitter arrives at the receivers by way of different travel paths through the formation surrounding the borehole. Upon generation of an acoustic pulse by the transmitter, a transmitter trigger pulse is transmitted uphole by means of a conductor in the logging cable. The signals produced by the receivers in response to the arrival of the acoustic pulse at the receivers are also transmitted uphole by way of conductors within the logging cable. The logging system is provided with downhole gating circuits which permit the first acoustic pulse to be detected and sent uphole by a first receiver, the second acoustic pulse to be detected and sent uphole by a second receiver, the third acoustic pulse to be detected and sent uphole by a third receiver, and the fourth acoustic pulse to be detected and sent uphole by a fourth receiver. The cycle is then repeated with successive acoustic pulses being detected and transmitted uphole by successive ones of the receivers. The time interval between the generation of each acoustic pulse and the detection of that pulse at a particular receiver is recorded. These time intervals are combined to provide an indication of the acoustic velocity of formations adjacent the logging tool. In such system, the influence of variations on the acoustic velocity measurement caused by the borehold medium as the acoustic pulses travel to and from the borehole tool is eliminated so that the measurements are dependent solely upon the character of the subsurface formations surrounding the borehole.

SUMMARY OF THE INVENTION

The present invention is directed to a new method and system by which acoustic logging signals may be recorded and displayed.

In accordance with such invention, there is provided a borehole logging tool having a transmitter of acoustic pulses and a pair of receivers located at spaced-apart, axial distances from the transmitter. Each receiver produces an output signal representative of the acoustic pulses traveling through the formation surrounding the borehole from the transmitter to the receiver. These receiver signals are applied to an uphole recording system wherein the receiver signals are alternately applied to the intensity modulation input of a cathode-ray oscilloscope during alternate acoustic cycles. By alternately applying these receiver signals to the cathode-ray oscilloscope, the sweeps of the electron beam are alternately intensity modulated to provide two variable-density traces. By photographically reproducing each sweep of the electron beam in side-by-side relationship, there is produced a two-receiver, variable-density recording.

A plurality of corresponding points along each of the two receivers' variable-density recordings are digitized and subtracted to provide traveltimes of the acoustic pulses through the formation surrounding the borehole between the two receivers. These traveltimes are divided by the distance between the receivers to provide interval traveltimes ($\Delta T$) representative of the velocity of the acoustic pulses over one-foot intervals between the receivers. A graph plotter records these interval traveltimes in correlation with the depth of the receivers within the borehole.

BRIEF DESCRIPTION OF THE DRAWINGS

FIG. 1 illustrates a borehole logging tool with which the recording system of the present invention may be utilized.

FIGS. 2A–2K and 7A–7K illustrate waveforms of signals generated by both the logging tool of FIG. 1 and the recording system of the present invention.

FIG. 3 is a block diagram of the recording system of the present invention.

FIG. 8 is an illustration of the two-receiver, variable-density recording produced by the recording system of FIG. 3.

DESCRIPTION OF THE PREFERRED EMBODIMENT

Figure 4A:
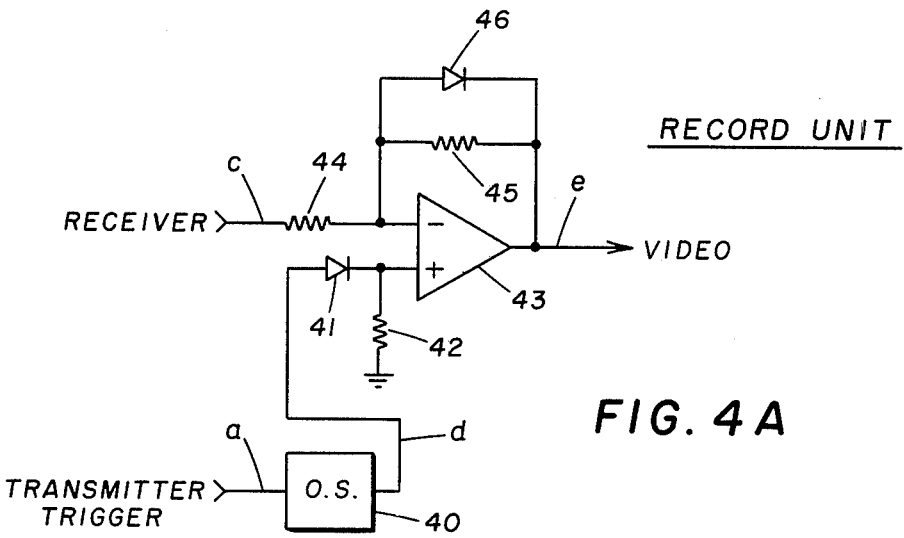
FIGS. 4A, 4B, 5, 6A, and 6B are electrical schematics of portions of the block diagram of FIG. 3.

Referring to FIG. 1, there is shown a borehole logging tool 10 suspended within the borehole 11 by means of logging cable 12. Tool 10 includes a transmitter T and two receivers R1 and R2. A pulser circuit 13 energizes transmitter T to transmit high-frequency acoustic pulses into the surrounding earth formation 14. For each acoustic cycle, the pulser 13 sends a transmitter trigger pulse uphole through the cable 12. These acoustic pulses are detected by receivers R1 and R2. During the first acoustic cycle, the receiver gating circuit 15 sends the detected signal from receiver R1 uphole by means of cable 12. During the next acoustic cycle, the receiver gating circuit 15 sends the detected signal from receiver R2 uphole by means of cable 12. These cycles are repeated with successive acoustic pulses being detected by the two receivers and the receiver outputs being selectively gated for sending the detected pulses uphole. The receiver gating circuit 15 also sends a receiver select signal uphole by way of cable 12, indicating which receiver output is being gated at any given time. For a more detailed description and operation of such a borehole logging tool, reference may be made to the aforementioned U.S.

Pat. No. 3,302,166 to Joseph Zemanek, Jr. The signals received uphole from a logging tool as described in the Joseph Zemanek, Jr., patent are illustrated in FIGS. 2A–2C.

FIG. 2A illustrates the transmitter trigger pulse produced by the pulser 13 each time the transmitter T is fired. FIG. 2B illustrates the receiver select signal from the receiver gating circuit 15 which is sent uphole and identifies the receiver whose output is being sent uphole. FIG. 2C illustrates the selected receiver output which is being sent uphole.

These transmitter trigger pulses, receiver signals, and receiver select signals are recorded by the recording system 20 as a function of the depth of the tool within the borehole. Driven by the logging cable 12 is a depth converter including a sheave 21a and a shaft encoder 21b that converts the mechanical rotation of the sheave to depth pulses. These depth pulses are recorded by the recording system 20 along with the transmitter trigger pulses, receiver signals, and receiver select signals.

It is the specific feature of the present invention to provide a new and improved recording system for recording the signals received from such a borehole logging tool as illustrated in FIG. 1.

Referring now to FIG. 3, there is illustrated in block diagram form the recording system of the present invention. During field operations, the transmitter trigger pulse, the receiver signal, and the receiver select signal from the borehole tool are all applied to a record unit 30. These pulses and signals are processed by the record unit 30 for recording on the magnetic tape unit 31 along with the depth pulses from the borehole tool. During recording operations in the field, these units 30 and 31 are supplied with 60-hertz power from a portable power supply 32. After the logging operation is completed, the magnetic tape may be taken to a processing center where the data recorded on the tape may be further processed through a playback unit 33 to an output device such as, for example, cathode-ray oscilloscope (CRO) 34. The CRO display is reproduced on the film recorder 35, with the movement of the film across the face of the CRO being synchronized with the recorded depth pulses to provide a two-receiver, variable-density recording as illustrated in FIG. 8.

Selected corresponding points on each of the two receiver logs, such as the first arrivals T1 and T2 of FIG. 8, are digitized by means of the ΔT unit 36. These points represent the corresponding arrival times of the acoustic pulses at the two receivers. The ΔT unit 36 further subtracts corresponding digitized points of these first arrivals T1 and T2 and divides the result by the distance between the two receivers to provide interval traveltimes that are proportional to the acoustic velocity of the pulses over one-foot intervals between the two receivers. These interval traveltimes are plotted by the graphic recorder 37 in correlation and the depth of the receivers in the borehole as the ΔT log of FIG. 8. The preferred embodiment of each of these units 30–37 will now be described in detail.

RECORD UNIT 30 (FIGS. 4A, 4B, AND 5)

Referring to the record unit 30, each transmitter trigger pulse from the downhole tool 10, as illustrated by the waveform a in FIG. 2A, is applied to the one-shot multivibrator 40 of FIG. 4A. Multivibrator 40 produces a 100μs-wide pulse in response to each transmitter trigger pulse. In a preferred operation, the transmitter is fired every 100 milliseconds. Accordingly, the transmitter trigger pulses from pulser 13 are occurring every 100 milliseconds. The output waveform of the multivibrator 40 is illustrated as waveform d in FIG. 2D. These 100-microsecond pulses are applied through diode 41 to the non-inverting input of the operational amplifier 43. The receiver signal from the borehole tool is applied by way of resistor 44 to the inverting input of operational amplifier 43, this signal being illustrated by waveform c in FIG. 2C. Resistors 44 and 45 establish the feedback conditions of operational amplifier 43. Operational amplifier 43 mixes the 100-microsecond transmitter trigger pulses and the receiver signal. Diode 46 serves to clip the composite signal and form it into a video signal. Thus, a composite video signal is provided which is applied to the video channel input of the magnetic tape unit 31. This composite video signal is illustrated by waveform e in FIG. 2E.

Figure 4B:
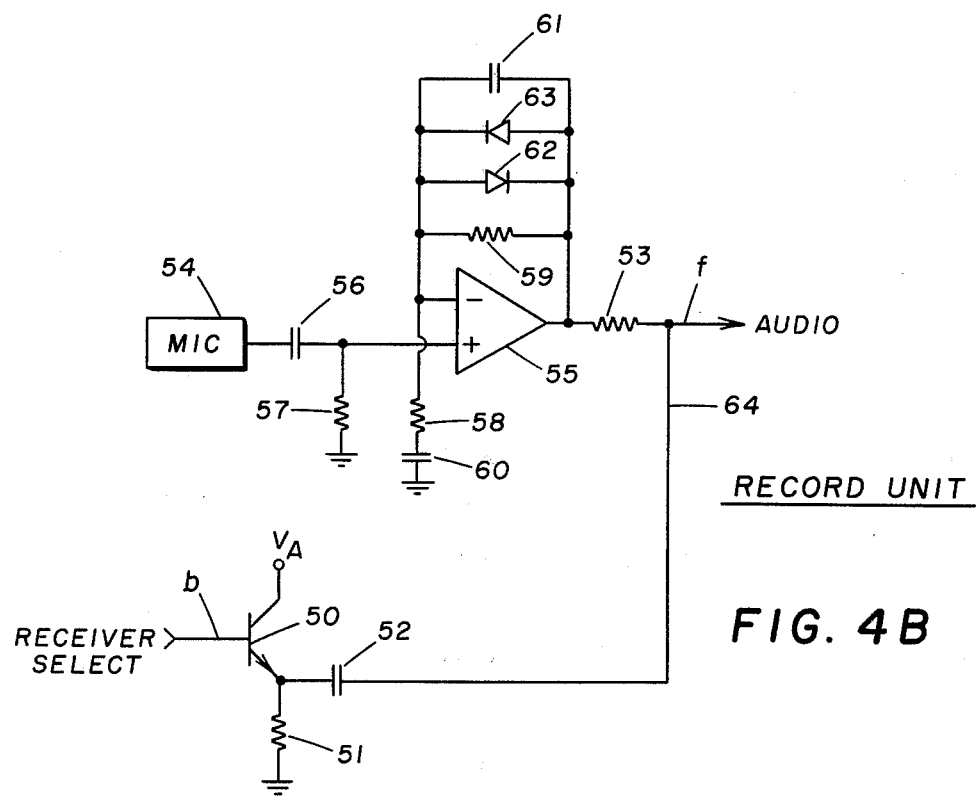

Referring now to FIG. 4B, there is illustrated the circuitry for processing the receiver select information from the borehole tool 10, as illustrated by waveform b in FIG. 2B. The receiver select signals are applied through an emitter follower, consisting of transistor 50 and resistor 51, and through capacitor 52 to the output line 64. Mixed with this signal by way of resistor 53 is voice information picked up by a microphone 54. The microphone output is applied to the non-inverting input of operational amplifier 55 by way of a coupling network consisting of capacitor 56 and resistor 57. Gain conditions are established by way of resistors 58 and 59 and capacitors 60 and 61. The diodes 62 and 63 serve to limit the amplifer's output to prevent the microphone information from obscuring the receiver select information should unusually loud voices or sounds be picked up by the microphone. The amplifier's output is applied through resistor 53 to line 64 where it is mixed with the receiver select signal from transistor 50 to form the composite audio signal illustrated by waveform f in FIG. 2F. This composite audio signal is applied to one of the audio channels of the magnetic tape unit 31.

Applied to the other audio channel of the magnetic tape unit 31 are the depth pulses from the depth indicator 21.

MAGNETIC TAPE UNIT 31

A sony EV-210 Videocorder manufactured by the Sony Corporation, Tokyo, Japan, is utilized as the magnetic tape unit 31. The Videocorder has four recording channels: a video channel, a control channel, and two audio channels. During recording operations in the field, this magnetic tape unit is interfaced with the borehole tool 10 through the record unit 30 such that the high-frequency transmitter trigger pulses and receiver signals are recorded on the video channel, the depth signal is recorded on one audio channel, the receiver select signal is recorded on the other audio channel, and timing control signals synchronized with the 60-hertz power supply 32 are recorded on the control channel.

In recording such signals, the magnetic tape speed of the Videocorder is 7.8 inches per second and the speed of the recording head drum is 1,800 revolutions per minute. The head-to-tape speed is 590 inches per second. The high-frequency response of the recording tracks of the video channel is 2 megahertz. The frequency response of the two audio channels and the control channel is 50–12,000 hertz.

During the recording operation just described, it is important that the recording time be accurately preserved. As there is usually no stable 60-hertz power available at the site of the borehole, it is a specific aspect of the present invention to provide a crystal-controlled power source 32 for driving the magnetic tape unit 31 at a constant recording speed. Timing control signals derived from this 60-hertz source are recorded by the magnetic tape unit on the control channel for later use at the processing center to synchronize the playback speed with the recording speed.

POWER SOURCE 32 (FIG. 5)

Figure 5:
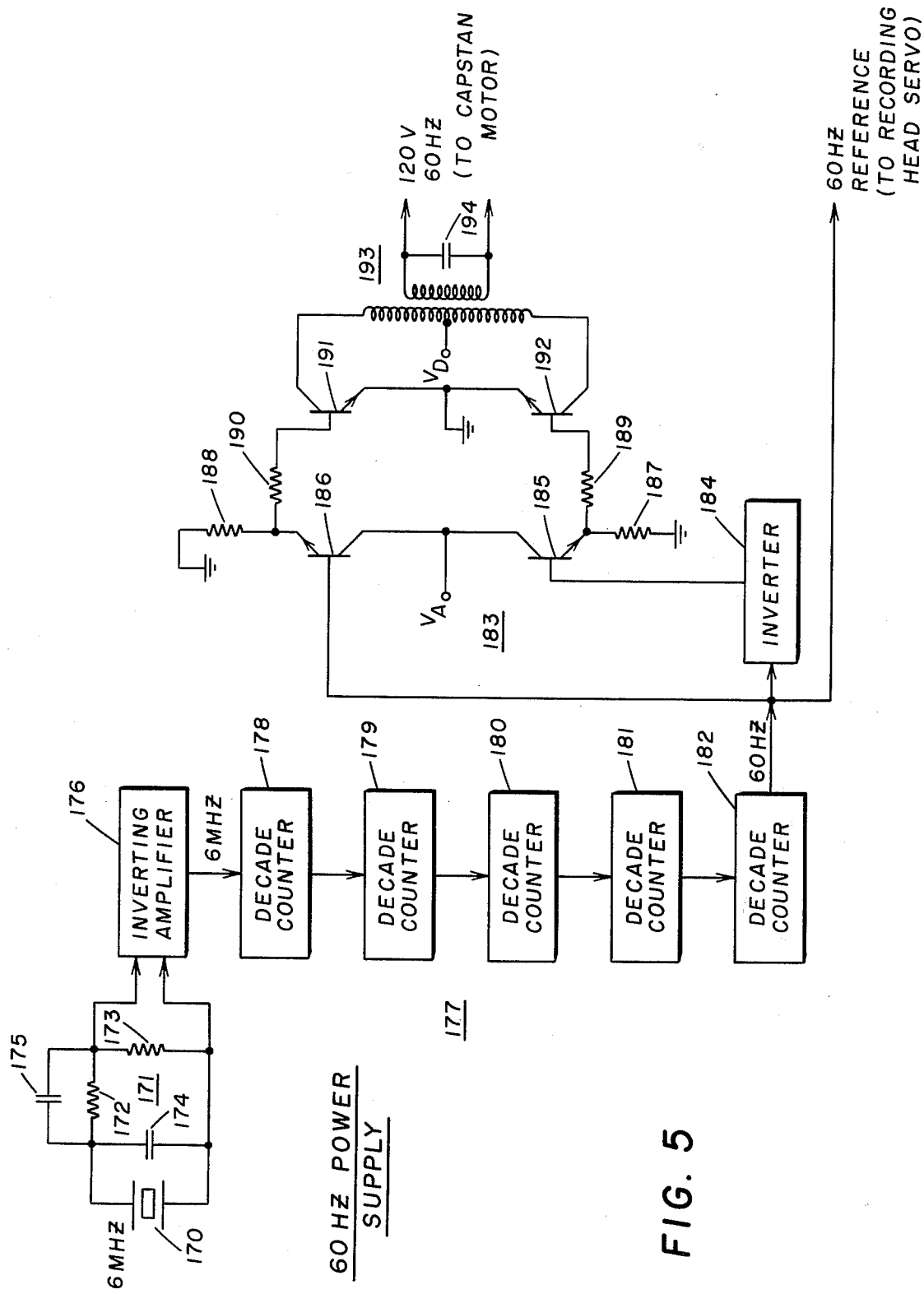

Referring to FIG. 5, there is illustrated in detail the 60-hertz power source 32 for use during the recording operation. A 6-megahertz crystal 170, a filter 171 including resistors 172 and 173, capacitors 174 and 175, and an inverting amplifier stage 176 form a 6-megahertz oscillator. The 6-megahertz output from amplifier stage 176 is counted down through a five-stage decade counter 177 comprising the five decade counters 178–182 to a 60-hertz square wave-reference signal.

This 60-hertz reference signal is utilized in two ways. Firstly, it is applied directly to the magnetic tape unit as a reference for the video head servo motor. Secondly, it is amplified by the push-pull amplifier stage 183 including the inverter 184, the transistors 185 and 186, and the resistors 187–190. The output from this push-pull amplifier drives the power-driven transistors 191 and 192 whose output is connected to the primary of transformer 193. Transformer 193 and shunting capacitor 194 provide a 120-volt, 60-hertz signal for driving the capstan motor of the magnetic tape unit 31.

Figures 6A, 6B:
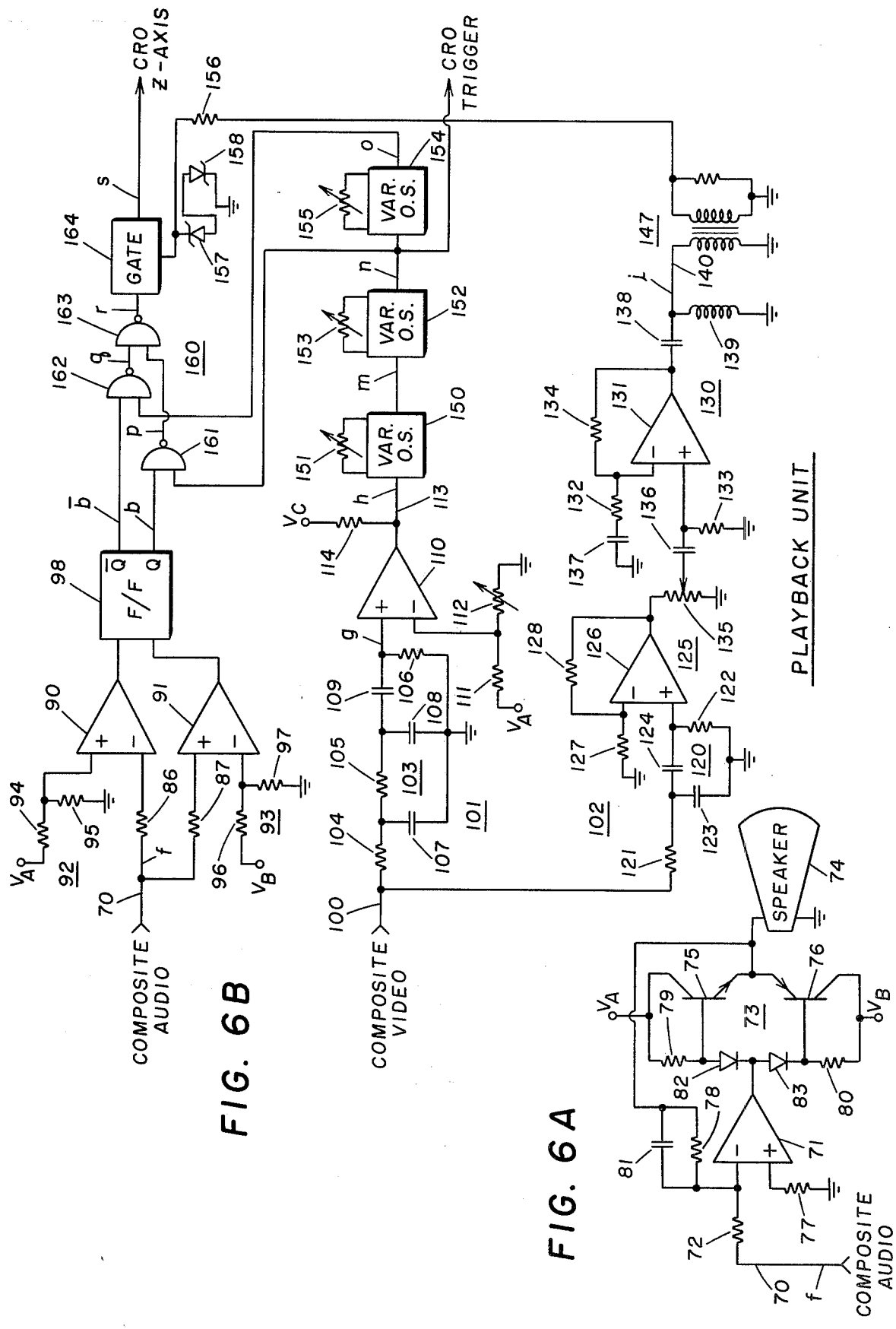

Having now described the recording operation carried out at the borehole site, the playback operation to be carried out at the processing center will be described. In the playback operation, the magnetic tape unit 31 is interfaced with the CRO 34 through the playback unit 33. Referring now to FIGS. 6A and 6B, there is illustrated in detail the playback unit 33.

PLAYBACK UNIT 33 (FIGS. 6A and 6B)

The composite audio signal (i.e., the combination of the receiver select signal and the microphone output) is applied from the magnetic tape unit 31 during playback onto input line 70 of the playback unit 33 of FIGS. 6A and 6B. FIG. 2F illustrates the waveform $f$ of the audio signal as reproduced by the magnetic tape unit during playback.

Line 70 applies this composite audio signal to the inverting input terminal of operational amplifier 71 of FIG. 6A by way of resistor 72. The output of amplifier 71 is applied through the power amplifier 73 to drive the speaker 74.

Power amplifier 73 includes the complementary-connected transistors 75 and 76. Bias conditions for amplifier 73 are supplied from voltage supplies $V_A$ and $V_B$ by way of resistors 79 and 80 and diodes 82 and 83. Resistors 72 and 78 and capacitor 81 establish the gain conditions for amplifiers 71 and 73. The output of speaker 74 is the voice information which was picked up by microphone 54 of the record unit 30 during logging operations.

Line 70 also applies this composite audio signal to the two comparators 90 and 91 by way of resistors 86 and 87, respectively, of FIG. 6B. These two comparators function as level detectors with input threshold levels set by the voltage dividers 92 and 93. Voltage divider 92 includes resistors 94 and 95 which set the input threshold of comparator 90 from power supply $V_A$. Similarly, voltage divider 93 includes resistors 96 and 97 which set the input threshold of comparator 91 from power supply $V_B$. The output from comparator 90 is a negative pulse whenever a positive-going spike in the composite audio signal exceeds the input threshold level of comparator 90. Similarly, the output from comparator 91 is a negative pulse whenever a negative-going spike exceeds the input threshold level of comparator 91. These two outputs are utilized to set and reset the flip-flop 98. Accordingly, the output of flip-flop 98 is a reproduction of the receiver select signal and the inverse of the receiver select signal as illustrated by waveforms $b$ and $\bar{b}$ of FIGS. 7E and 7F.

Also applied to playback unit 33 is the composite video signal from magnetic tape unit 31. This composite video signal is applied by line 100 to both a triger enhancement circuit 103 and to a signal enhancement circuit 120. The trigger enhancement circuit 103 is a high-pass filter which enhances the high-frequency component of the composite video signal, which is the transmitter trigger pulse, and suppresses the lower frequency component, which is the receiver signal. This filter includes resistors 104–106 and capacitors 107–109. The filtered video signal is illustrated by waveform $g$ in FIG. 2G and is applied to the non-inverting input of comparator 110 where it is compared to a trip level applied to the inverting input from voltage source $V_A$ by way of a voltage divider including resistor 111 and the variable resistor 112. This trip level is illustrated on waveform $g$ in FIG. 2G and is set such that only the transmitter trigger pulse will trip the comparator to provide an output signal on line 113, output biasing being through resistor 114 from power supply $V_C$. This output signal is illustrated by waveform $h$ in FIG. 2H.

The signal enhancement circuit 120 suppresses the transmitter trigger pulse to enhance the receiver signal. The signal enhancement circuit is a bandpass filter including resistors 121 and 122 and capacitors 123 and 124. The filtered signal is applied to amplifier 125. This amplifier includes the operational amplifier 126 and feedback resistors 127 and 128. Amplifier 125 amplifies the filtered signal while preserving signal linearity. Amplifier 130, including operational amplifier 131, resistors 132–134, variable resistor 135, capacitors 136–138, and inductor 139, further amplifies the signal to provide a receiver signal on line 140 as illustrated by waveform $i$ in FIG. 2I. As previously discussed, the acoustic pulses recorded in this manner represent, alternately, the R1 receiver signal and the R2 receiver signal. Consequently, to allow the continuous recording of each receiver signal in the form of a log so that changes in each signal can be seen as the borehole tool traverses the borehole, the output recorder must be synchronized with the receiver select signal produced by the borehole tool.

In the preferred embodiment described herein, including the CRO 34 and film recorder 35, the intensity modulation of successive horizontal sweeps of the CRO needs to be synchronized alternately with the R1 and R2 portions of the receiver select signal in order to provide for the two-receiver, variable-density presentation as seen in FIG. 8. This synchronization is accomplished in the following manner.

The trigger pulse $h$ on line 113 triggers a variable one-shot multivibrator 150, including variable resistor 151, which produces the signal *m* having the waveform of FIG. 7B. The trailing edges of the positive-going pulses of signal *m* trigger the variable one-shot multivibrator 152, including variable resistor 153, to produce the signal *n* having the waveform of FIG. 7C. Similarly, the trailing edges of the positive-going pulses of signal *n* trigger the variable one-shot multivibrator 154, including variable resistor 155, to produce the signal *o* having the waveform of FIG. 7D.

As can be seen from the waveforms of FIGS. 7C, 7D, and 7J, the R1 receiver signals occur during every other positive-going pulse of the *n* signal, while the R2 receiver signals occur during every other positive-going pulse of the *o* signal. Consequently, to provide for the two-receiver, variable-density log, the *n* and *o* signals are alternately gated by means of the CRO gating circuit 160 to cause successive sweeps of the electron beam to be modulated successively by R1, R2, R1, R2, R1, etc., receiver signals.

Inputs to CRO gating circuitry 160 are the *n* and *o* signals and the *b* and $\bar{b}$ signals from flip-flop 98 which represent the receiver select and inverse receiver select signals. The *n* and *b* signals are applied to NAND gate 161 to provide the *p* signal having the waveform of FIG. 7G. This *p* signal has a negative-going pulse that occurs in the time period of every other acoustic cycle during which the R1 receiver has been selected for transmitting its receiver signal uphole.

Similarly, the *o* and $\bar{b}$ signals are applied to NAND gate 162 to provide the *q* signal having the waveform of FIG. 7H. This *q* signal has a negative-going pulse that occurs in the time period of every other acoustic cycle during which the R2 receiver has been selected for transmitting its receiver signal uphole.

By applying both the *p* and *q* signals to the NAND gate 163, there is provided the signal *r* having the waveform shown in FIG. 7I. It can be seen from FIGS. 7I and 7J that signal *r* has a positive-going pulse during each of the acoustic cycles, but the time occurrence of these pulses is alternately synchronized with the time periods during which the receiver signals (as represented by signal *i*) are being detected by the receivers R1 and R2.

By next gating the signal *i* by means of signal *r*, there is produced the signal *s* having the waveform of FIG. 7K which modulates the horizontal sweeps of the CRO alternately with the R1 and R2 receiver signals. Any other unwanted component of the signal *i*, such as noise, switching spikes caused by the receiver gating circuitry downhole during receiver switching, or unsuppressed transmitter trigger pulses, will be inhibited from intensity modulating the CRO. The signal *s* is produced by applying the *r* signal to one input of gate 164 and applying signal *i* to the other input of gate 164 by way of transformer 147, resistor 156, and Zener diodes 157 and 158. Diodes 157 and 158 serve to amplitude limit the waveform of the receiver signals R1 and R2 to prevent overmodulation of the CRO.

The outputs of the playback unit to the CRO are therefore the CRO trigger signal *n* and the CRO modulation signal *s*. The trigger signal *n* is applied to the sweep input of the CRO, while the modulation signal *s* is applied to the modulation input of the CRO.

CATHODE-RAY OSCILLOSCOPE (CRO) 34

A Tektronix Oscilloscope, Model 461, supplied by Tektronix, Inc., Beaverton, Oregon, is used as the CRO 34. In response to the trigger signal *n* and the modulation signals from the playback unit 32, there is alternately displayed on the face of the CRO 34 variable-density traces of the two receiver signals R1 and R2.

FILM RECORDER 35

A Beattie Magazine Camera, Model DSV 13302, with a Beattie Periscope, Model 13301, supplied by Beattle-Coleman, Inc., of Anaheim, California, is used as the film recorder 35. As the depth pulses from the magnetic tape unit 31 drive the film recorder 35, the film moves as a function of the movement of the borehole tool, thereby recording each electron beam sweep of the CRO in a side-by-side relationship on the film. This two-receiver, variable-density recording is illustrated in FIG. 8. By producing a two-receiver, variable-density recording, a determination is made of the interval traveltime ΔT through the formation surrounding the borehole and located between the two receivers. This determination is carried out by means of the ΔT unit 36 and the plotter 37.

It is important in this two-receiver, variable-density recording that the recording of the trailing portions of the acoustic pulses at the first receiver R1 not interfere with the recording of the time arrivals of the leading portions of the acoustic pulses at the second receiver R2. Such interference is prevented by utilizing the trailing edges of the positive portions of the signal *n* to trigger the leading edges of the positive portions of the signal *o*. The signal *n*, as described above, is utilized in the production of that portion of signal *r* that occurs simultaneously with the R1 signal. The signal *o*, as described above, is utilized in the production of that portion of signal *r* that occurs simultaneously with the R2 signal. In this manner, the R2 modulating portion of the signal *r* begins at a time during the horizontal sweep of the cathode-ray oscilloscope that is established by the termination of the R1 modulating portion of the signal *r* during alternate horizontal sweeps.

ΔT UNIT 36

The ΔT unit 36 is a "Gradicon" graphical-to-digital converter supplied by Instronics, Inc., of Ogdensburg, New York, interfaced with a CDC 6400 Computer supplied by Control Data Corporation. The Gradicon includes a digitizing table on which the film recording (or reproduction thereof) is placed. A magnetically coupled cursor is moved along the recordings of the two receiver signals, such as the first arrival curves T1 and T2. Located under the surface of the digitizing table is a coil that is attached to a mechanical gantry and follows the movement of the cursor by means of an electromechanical closed-loop servo system. The cursor senses a signal generated by the coil as it moves in the X-Y plane and produces a digital readout of the X-Y coordinates of the first arrival curves T1 and T2. The basic system software is in FORTRAN language and is supplied by Instronics, Inc. as a standard software package along with the Gradicon converter. The computer subtracts the digital readouts from the corresponding points on the two curves T1 and T2 and divides the result by the distance between the two receivers R1 and R2 to provide interval traveltimes that are proportional to the velocity of the acoustic pulses over one-foot intervals between the receivers R1 and R2.

PLOTTER 37

The plotter 37 includes a California Computer Products Company Model 905 Controller and a Model 936 Plotter. The plotter records the interval traveltimes from the ΔT unit 36 as a continuous ΔT log in correlation with the depth of the receivers in the borehole. This ΔT log is proportional to the velocity of the acoustic pulses over one-foot intervals between the receivers R1 and R2.

It is to be understood that the units 30–37 are merely representative of one embodiment of the present invention. Particularly with respect to the embodiments of units 30, 32, and 33, various types and values of circuit components may be utilized. In accordance with the specific embodiments of units 30, 32, and 33 as illustrated in FIGS. 4A, 4B, 5 and 6, the following Table I sets forth specific types and values of the circuit components.

TABLE I

| Reference Designation | Description |
| --- | --- |
| Operational amplifiers 43, 55, 71, and 126 | 747A (Fairchild) |
| Operational amplifiers 90, 91, and 110 | 734 (Fairchild) |
| Operational amplifier 131 | 741 (Fairchild) |
| Diodes 41, 46, 62, and 63 | 1N914 (Fairchild) |
| Transistor 76 | 2N1132 (Fairchild) |
| Multivibrators 40, 150, 152, and 154 | 74121 (Texas Instruments) |
| Flip-flop 98 | 7474 (Texas Instruments) |
| Transistors 50, 75, 185, and 186 | 2N2102 (R.C.A.) |
| Transistors 191 and 192 | 2N1490 (R.C.A.) |
| Zener diodes 157 and 158 | 1N750 (Texas Instruments) |
| Gate 164 | DG190 (Siliconix) |
| NAND gates 161–163 | 7400 (Texas Instruments) |
| Encoder 21b | T-0200D (Trump-Ross) |
| Decade counters 178–182 | CD4018 (R.C.A.) |
| Inverting amplifier 176 | CD4007 (R.C.A.) |
| Inverter 184 | CD4011 (R.C.A.) |
| Diodes 82 and 83 | 1N4006 (R.C.A.) |
| Crystal 170 | 6 MHZ (International Crystal) |
| Transformer 193 | TY-76A (Triad Manufacturing) |
| Transformer 147 | MT7-H (Microtran) |
| Choke 139 | 15 MHY (Thordason) |
| Microphone 54 | Realistic 395 (Radio Shack) |
| Speaker 74 | 1/2W, 8 ohms (Archer) |
| Resistors 44, 57, 59, 77, 111, 122, 133, and 134 | 100 Kohms |
| Resistors 45, 79, 80, 94, 96, and 121 | 10 Kohms |
| Resistors 51, 53, 58, 114, 186, and 187 | 1 Kohm |
| Resistor 172 | 13 Kohms |
| Resistor 173 | 22 Mohms |
| Resistors 189 and 190 | 68 ohms |
| Resistors 42, 86, 87, 95, 97, and 156 | 4.7 Kohms |
| Resistors 127 and 132 | 20 Kohms |
| Resistor 128 | 470 Kohms |
| Resistor 104 | 47 ohms |
| Resistor 105 | 470 ohms |
| Resistors 72 and 78 | 200 Kohms |
| Variable resistor 112 | 5 Kohms |
| Variable resistor 135 | 25 Kohms |
| Capacitor 174 | 10 pf |
| Capacitor 175 | 20 pf |
| Capacitor 194 | 4 μf |
| Capacitors 81 and 109 | 470 pf |
| Capacitor 123 | .0015 μf |
| Capacitors 108 and 124 | .001 μf |
| Capacitor 137 | 1 μf |
| Capacitors 56, 105 and 136 | .01 μf |
| Capacitor 61 | .022 μf |
| Capacitors 52 and 138 | .1 μf |
| Power supply $V_A$ | +15 V |
| Power supply $V_B$ | +12 V |
| Power supply $V_C$ | +5 V |

I claim:

1. A method of determining the interval velocity of acoustic pulses that are generated by a transmitter within a borehole and travel through the formation surrounding the borehole to a pair of receivers located at spaced-apart, axial positions within the borehole, comprising the steps of:
   a. moving the transmitter and the pair of receivers through the borehole,
   b. triggering the sweep of a cathode-ray oscilloscope in response to each acoustic pulse,
   c. intensity modulating alternate sweeps of the cathode-ray oscilloscope with signals received from alternate receivers,
   d. reproducing each sweep of the cathode-ray oscilloscope to produce a pair of variable-density curves representing the traveltime arrivals of the acoustic pulses at the pair of receivers,
   e. digitizing said pair of variable-density curves at a plurality of selected points along said curves, and
   f. subtracting the digitized values of each curve at each of said plurality of points to obtain the traveltime of the acoustic pulses between the pair of receivers at each of the selected points along said curves.

2. The method of claim 1 further including the step of:
   recording said traveltimes in correlation with the depth of the receivers within the borehole.

3. The method of claim 1 further including the step of:
   dividing each of the traveltimes by the distance between the pair of receivers to obtain interval traveltimes that are proportional to the velocity of the acoustic pulses over one-foot intervals between the pair of receivers.

4. The method of claim 3 further including the step of:
   recording said interval traveltimes in correlation with the depth of the receivers within the borehole.

5. An acoustic velocity logging system comprising:
   a. a transducer assembly adapted for movement through a borehole, including:
      i. a transmitter of acoustic energy pulses, and
      ii. first and second receivers located at different, spaced-apart, axial distances from said transmitter, each receiver producing a signal representative of the acoustic pulses traveling through the formation surrounding the borehole from the transmitter to the receiver.
   b. a cathode-ray oscilloscope,
   c. means for intensity modulating the cathode-ray oscilloscope with the signals from said first and second receivers, such signals modulating alternate sweeps of the cathode-ray oscilloscope whereby every other sweep displays a variable-density trace of the signal from one receiver on the face of the cathode-ray oscilloscope,
   d. means for photographically reproducing each successive sweep of the electron beam of the cathode-ray oscilloscope in side-by-side relationship to produce a two-receiver, variable-density recording,
   e. means for digitizing a plurality of corresponding points along each of the two variable density recordings, and
   f. means for subtracting the corresponding digitized values of the two variable-density recordings to provide a plurality of traveltimes of the acoustic energy pulses through the formation surrounding the borehole and located between the two receivers.

6. The system of claim 5 further including:
a recorder for recording said traveltimes in correlation with the depth of the receivers within the borehole.

7. The system of claim 5 further including:
means for dividing the plurality of traveltimes by the distance between the two receivers to provide a plurality of interval traveltimes representative of the velocity of the acoustic pulses over one-foot intervals between the two receivers.

8. The system of claim 7 further including:
a recorder for recording said interval traveltimes in correlation with the depth of the receivers within the borehole.

* * * * *